(12) United States Patent
Duan et al.

(10) Patent No.: US 8,370,994 B2
(45) Date of Patent: Feb. 12, 2013

(54) AUTOMATICALLY OPENING HINGE ASSEMBLY FOR PORTABLE ELECTRONIC DEVICES

(75) Inventors: Chao Duan, Shenzhen (CN); Chia-Hua Chen, Taipei (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 291 days.

(21) Appl. No.: 12/952,338

(22) Filed: Nov. 23, 2010

(65) Prior Publication Data

US 2011/0277274 A1 Nov. 17, 2011

(30) Foreign Application Priority Data

May 14, 2010 (CN) .......................... 2010 1 0172144

(51) Int. Cl.
*E05D 11/10* (2006.01)
(52) U.S. Cl. .......................................... 16/330; 16/303
(58) Field of Classification Search .................... 16/303, 16/330, 327, 328, 329, 331, 332, 334, 324, 16/325, 326, 349, 352, 353, 376, 377; 455/575.3; 379/433.11, 433.12, 433.13; 361/679.06, 361/679.07, 679.11, 679.12, 679.15, 679.16, 361/679.2, 679.27, 679.28
See application file for complete search history.

(56) References Cited

U.S. PATENT DOCUMENTS

| 5,923,751 | A   | * | 7/1999  | Ohtsuka et al. | 379/433.13 |
|-----------|-----|---|---------|----------------|------------|
| 6,886,221 | B2  | * | 5/2005  | Minami et al.  | 16/303     |
| 7,627,930 | B2  | * | 12/2009 | Duan et al.    | 16/330     |
| 7,913,359 | B2  |   | 3/2011  | Duan et al.    |            |
| 2006/0174443 | A1 | * | 8/2006 | Takagi et al.  | 16/330     |
| 2006/0242795 | A1 | * | 11/2006 | Duan et al.   | 16/330     |
| 2006/0242796 | A1 | * | 11/2006 | Duan et al.   | 16/330     |
| 2008/0034541 | A1 | * | 2/2008 | Duan et al.    | 16/330     |
| 2009/0165250 | A1 | * | 7/2009 | Duan et al.    | 16/343     |

FOREIGN PATENT DOCUMENTS

CN 101469738 A 7/2009

* cited by examiner

*Primary Examiner* — Jeffrey O Brien
(74) *Attorney, Agent, or Firm* — Altis Law Group, Inc.

(57) ABSTRACT

A hinge assembly includes a main shaft, a fixing seat, a follower, a cam and a first elastic element. The fixing seat is fixed with the main shaft. The follower is placed around the shaft, and the fixing seat selectively locks with the follower. The cam is placed around the shaft, and engages with the follower. The first elastic element provides an elastic force to make the cam and the follower resist each other and provides a force to make the cam and the follower rotate together.

13 Claims, 10 Drawing Sheets

AUTOMATICALLY OPENING HINGE ASSEMBLY FOR PORTABLE ELECTRONIC DEVICES

BACKGROUND

1. Technical Field

The present disclosure relates to hinge assemblies and, particularly, to an automatically opening hinge assembly for foldable devices such as portable telephones, portable computers.

2. Description of Related Art

Traditional automatic hinge assemblies can automatically open a foldable mobile phone, which generally includes a cover section and a body section. This kind of hinge assembly usually includes a cam and a control member. The cam has a tendency to rotate. However, the control member limits the cam to rotate. Thus, the control member has to be under a large shearing force. Accordingly, the control member needs to be made of hard and high strength material, which increases the cost. In addition, the control member easily produces noise during movement.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present hinge assembly. Moreover, in the drawings, like reference numerals designate corresponding parts throughout the several views.

DETAILED DESCRIPTION

Figure 1:
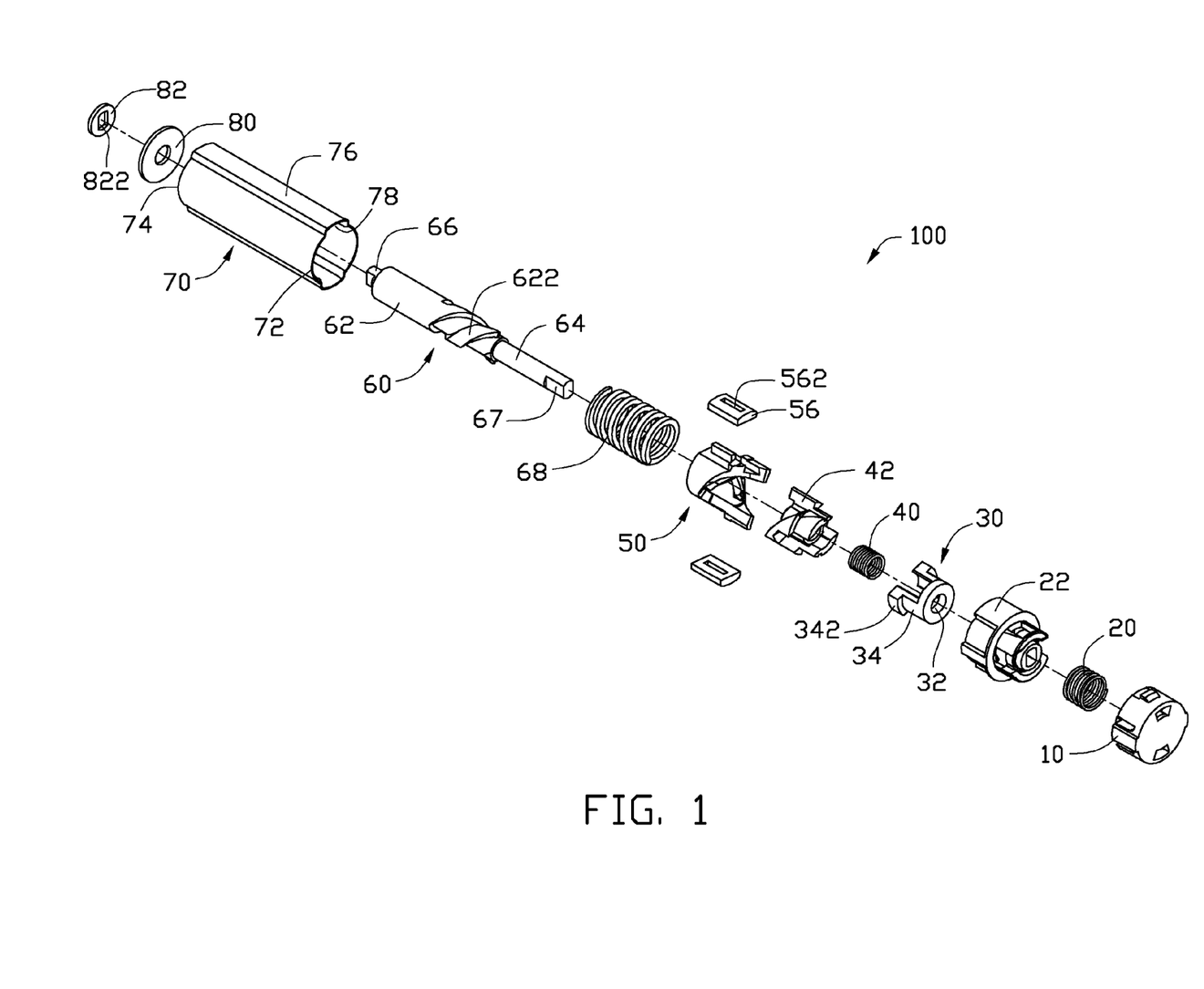
FIG. 1 is an exploded, isometric view of the exemplary embodiment of the hinge assembly shown in FIG. 1.
Figure 2:
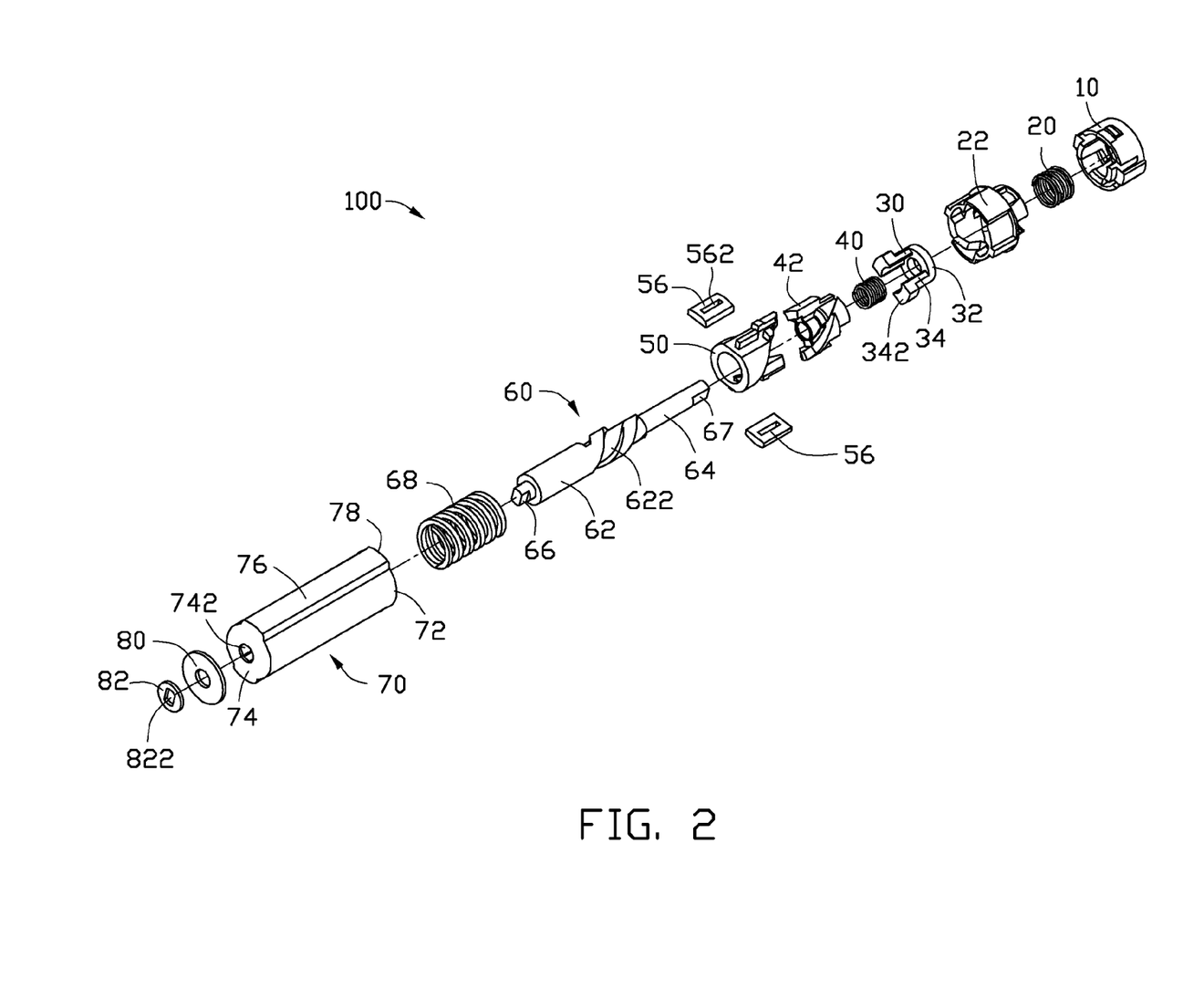
FIG. 2 is similar to FIG. 1, but viewed from another aspect.

Referring to the drawings in detail, FIGS. 1 and 2 show a hinge assembly 100, applied to a foldable electronic device such as a flip type mobile phone. The hinge assembly 100 could be used in other environments (e.g. cabinet doors). Although proving particularly advantageous when used in foldable electronic devices, the hinge assembly 100 should not be considered limited in scope solely to foldable electronic devices.

The hinge assembly 100, in the embodiment illustrated, includes a button 10, a first elastic member 20, a receiving seat 22, a control member 30, a second elastic member 40, a cam 42, a follower 50, two cushions 56, a shaft 60, a main elastic member 68, a sleeve 70, a washer 80 and a ring 82.

Figure 3:
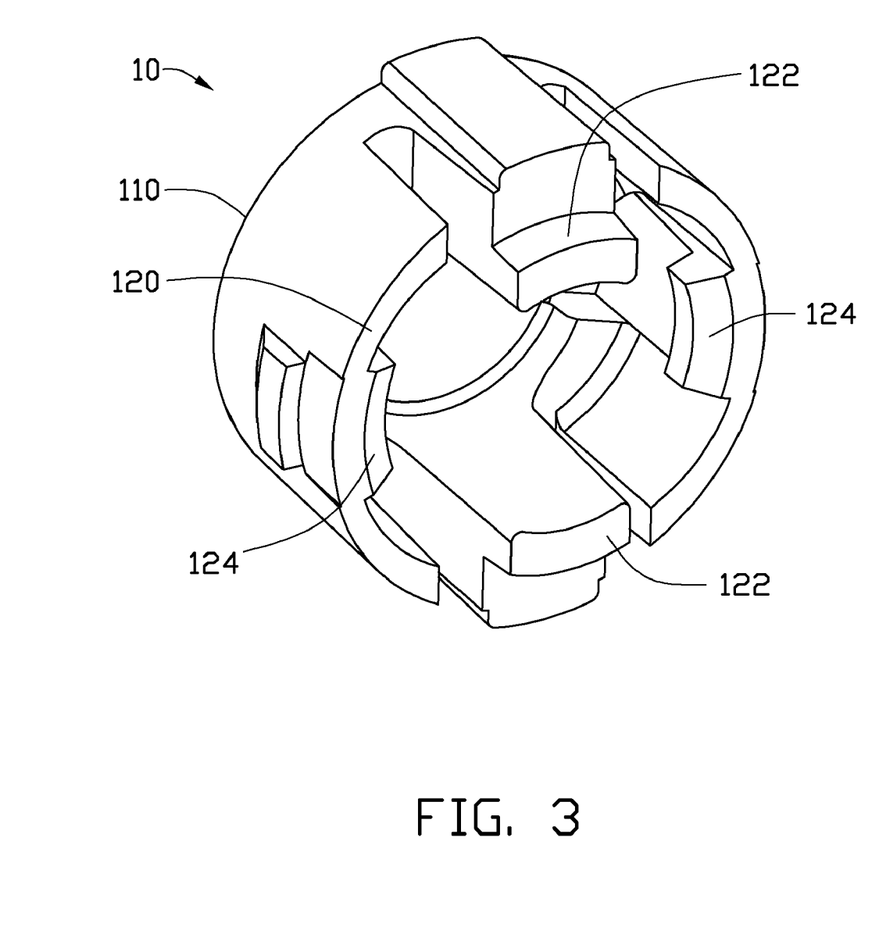
FIG. 3 is an enlarged view of the button.

Referring to FIG. 3, the button 10 is substantially cylindrical, and includes a pressed end 110 and an opposite open end 120. Two symmetric arms 122 and two symmetric clasps 124 are formed on the open end 120. The arms 122 press the control member 30, and the clasps 124 latch with the receiving seat 22.

The first elastic member 20 is a cylindrical helical spring (i.e., occupying a cylindrical volume). The first elastic member 20 is disposed between the button 10 and the receiving seat 22.

Figure 4:
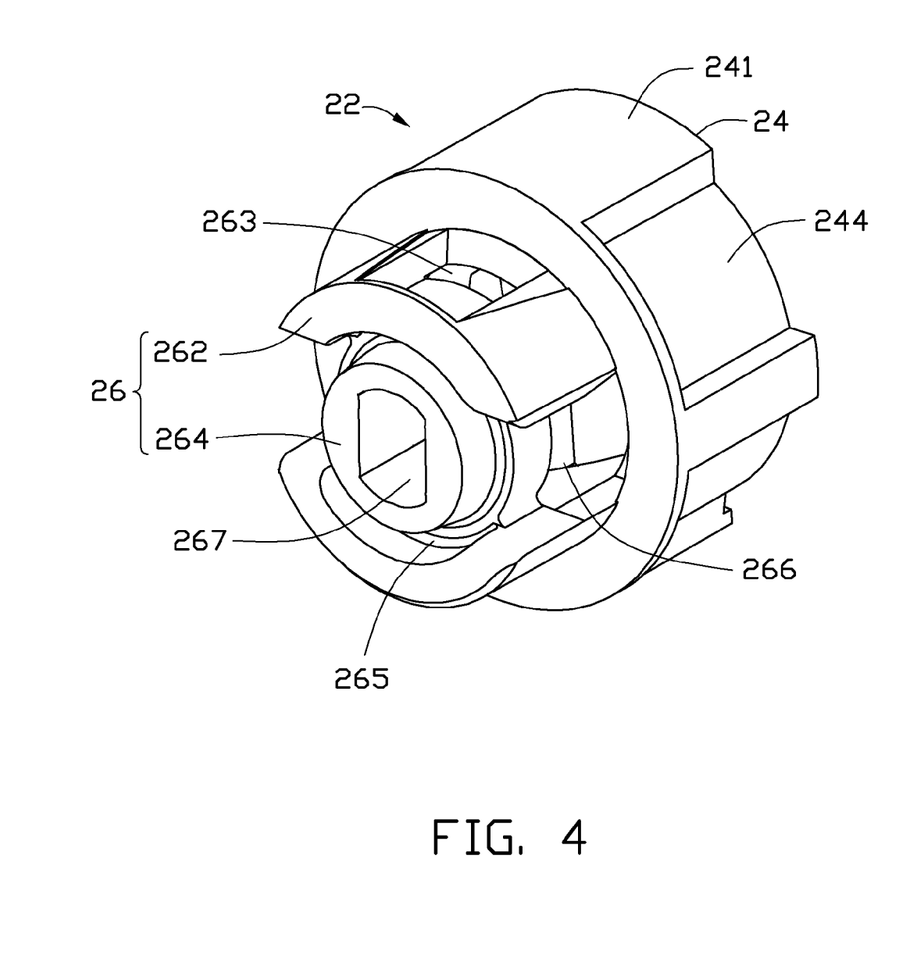
FIG. 4 is an enlarged view of the receiving seat.
Figure 5:
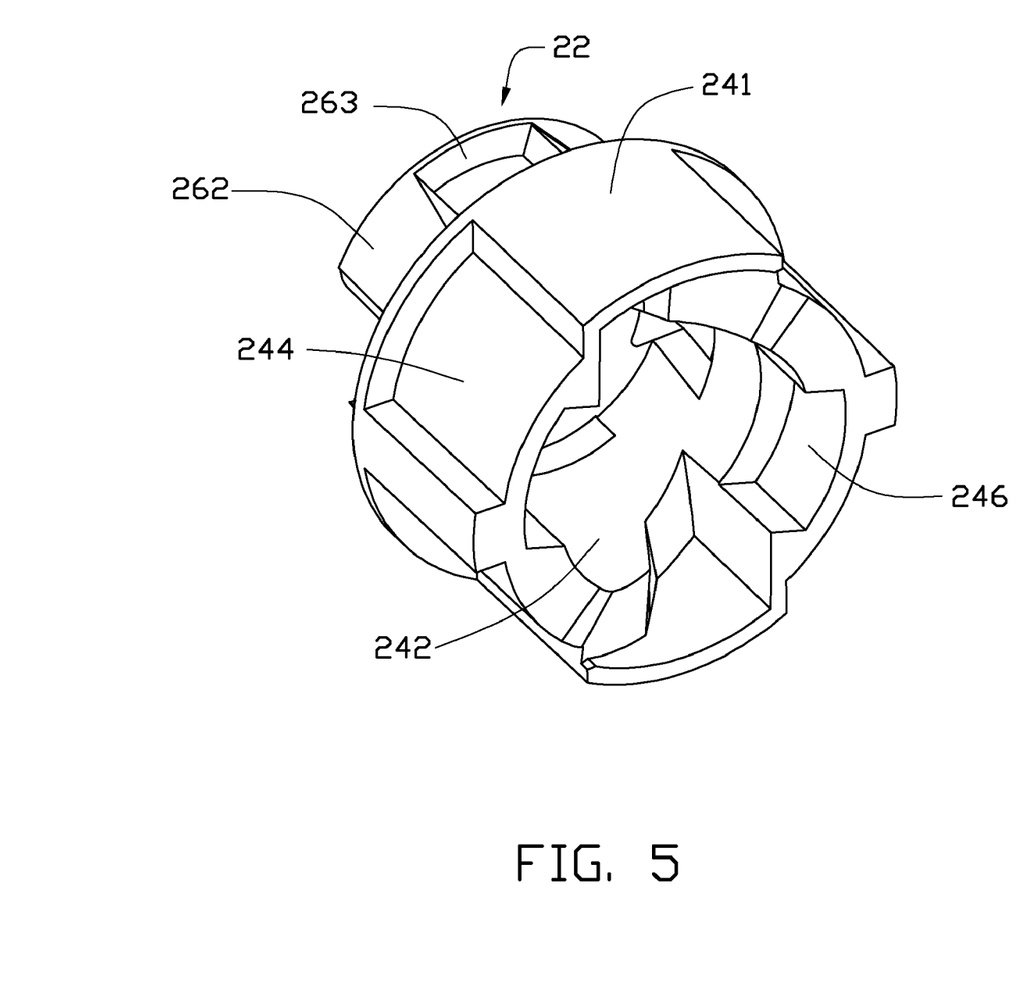
FIG. 5 is similar to FIG. 4, but viewed from another aspect.

Referring to FIGS. 4 and 5, the receiving seat 22 includes a seat portion 24 and a latching portion 26 connected to one end of the seat portion 24. The seat portion 24 is substantially a hollow cylinder, and includes an outer surface 241 and an inner surface 242. The outer surface 241 defines a plurality of seat grooves 244 engaging with a body section of the mobile phone so that the receiving seat 22 and the body section cannot rotate relative to each other. One end of the inner surface 242 away from the latching portion 26 defines two limiting grooves 246. The latching portion 26 includes two opposite arcuate walls 262 and a column 264. The arcuate walls 262 extend from one end of the inner surface 242 of the seat portion 24. Two guide grooves 266 are defined between the arcuate walls 262 for receiving the arms 122. Each arcuate wall 262 defines a notch 263 for receiving a corresponding clasp 124 of the button 10. The column 264 extends from an inside of the arcuate walls 262, and is coaxially disposed with the seat portion 24. A receiving groove 265 is defined between the column 264 and the arcuate walls 262. One end of the first elastic member 20 is placed around the column 264, and is received in the receiving groove 265. The column 264 defines a through hole 267 for fixedly connecting to the main shaft 60.

The control member 30 includes a body 32 and two extensions 34 integrally formed together. The control member 30 can be received in the seat portion 24 of the receiving seat 22. The body 32 abuts against the column 264, and is exposed from the guide grooves 266. The extensions 34 can be received in a corresponding limiting groove 246. A block 342 radially extends from a distal end of each extension 34. The blocks 342 allow the extensions 34 to resist a large shearing force so that the control member 30 can made of a relatively soft material. In addition, the control member 30 can produce less noise due to being made from soft material.

The second elastic member 40 is substantially cylindrical, and may be received in the control member 30 for returning the control member 30.

Figure 6:
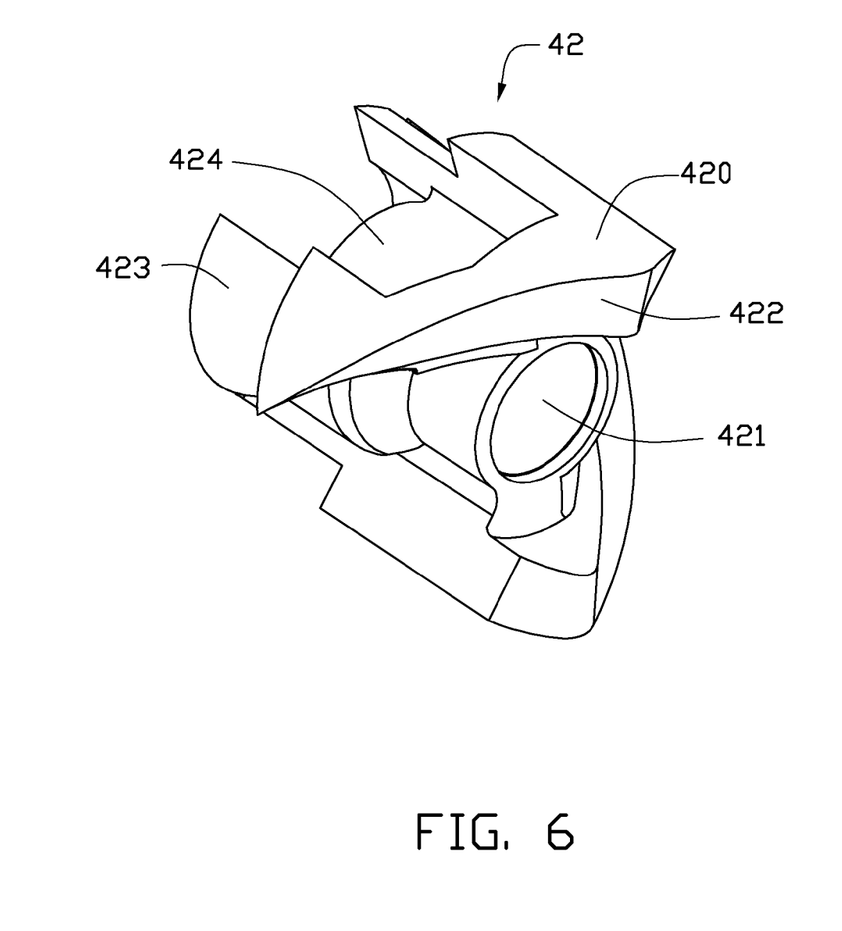
FIG. 6 is an enlarged view of the cam in FIG. 2.

Referring to FIG. 6, the cam 42 includes a cam portion 420 defining a through passage 421. The cam portion 420 includes a first cam surface 422 at one end thereof. Two extending walls 423 extending from an opposite end of the cam portion 420 can be received in the seat portion 24. Two slots 424 are defined between the extending walls 423. The extensions 34 are received in the slots 424.

Figure 7:
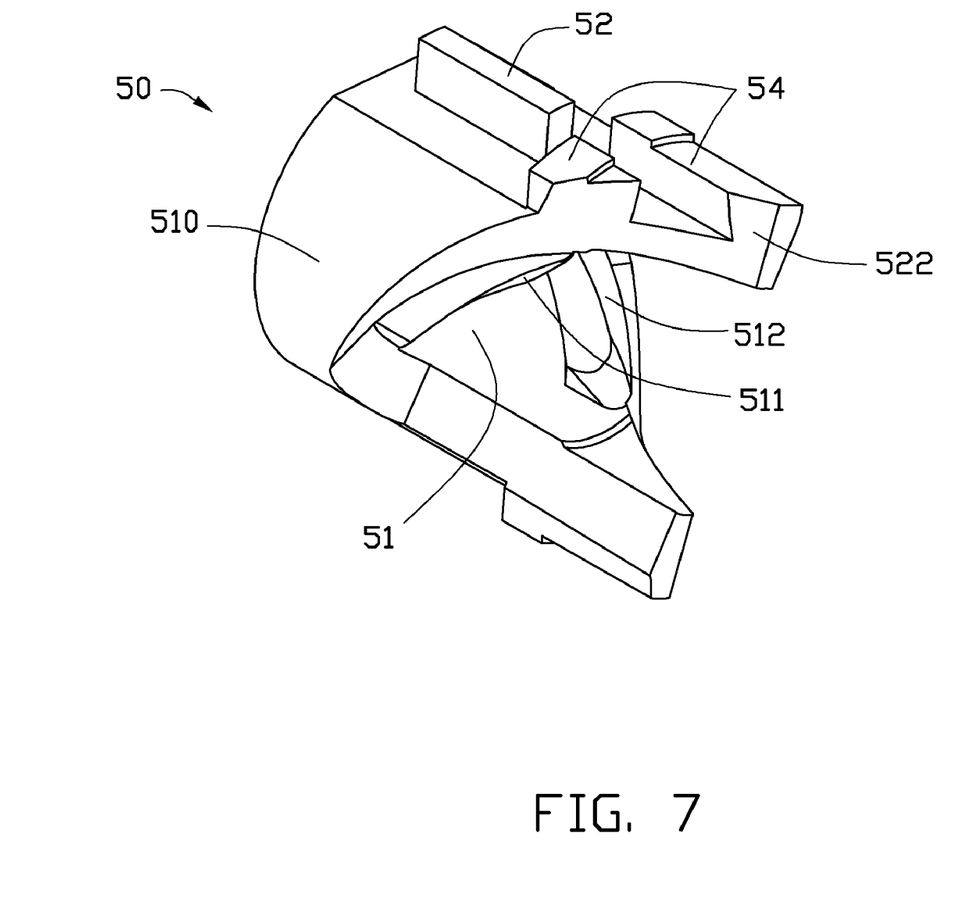
FIG. 7 is an enlarged view of the follower in FIG. 2.

Referring also to FIG. 7, the follower 50 includes a cylindrical circumferential wall 510 and an inner circumferential wall 512. Two symmetric projections 52 are formed on the outer circumferential wall 510. Two cushions 54 are formed adjacent to a corresponding projection 52. One end of the follower 50 has a second cam surface 522 for engaging with the first cam surface 422 of the cam 42. The follower 50 defines a through hole 51 defined by the inner circumferential wall 512. An inner thread 511 is formed on the inner circumferential wall 512.

The cushions 54 are made of soft material relative to the material of follower 50, for example, polyoxymethylene (POM). Each cushion 54 defines a cutout 562 for engaging with the projections 52 so that the cushions 54 can be latched to the follower 50. The projections 52 and the ribs 54 are engaged together with the sleeve 70. The soft cushions 54 can reduce noises with the sleeve 70.

The shaft 60 includes a first shaft portion 62 and a second shaft portion 64. The first shaft portion 62 defines an outer thread 622 engaging with the inner thread 511 of the follower 50. One end of the shaft 60 forms a locking end 66. The other end of the shaft 60 forms a latching portion 67. The main elastic member 68 is a helical spring, and may be fitted over the first shaft portion 62.

The sleeve 70 is a substantially hollow cylinder, and includes an open end 72 and a partially-closed end 74. The partially-closed end of the sleeve 74 defines a central hole 742. Two long troughs 78 are defined in an inner wall of the sleeve 70 and two sleeve blocks 76 are formed corresponding to the long troughs 78. The sleeve blocks 76 engage with a cover section of a mobile phone.

The washer 80 is substantially disk-shaped, and rotatably connects to the locking end 66 reducing energy loss with the sleeve 70. The ring 82 defines a hole 822 in a central area thereof. The ring 82 fixes with the locking end 66 of the shaft 60.

Figure 8:
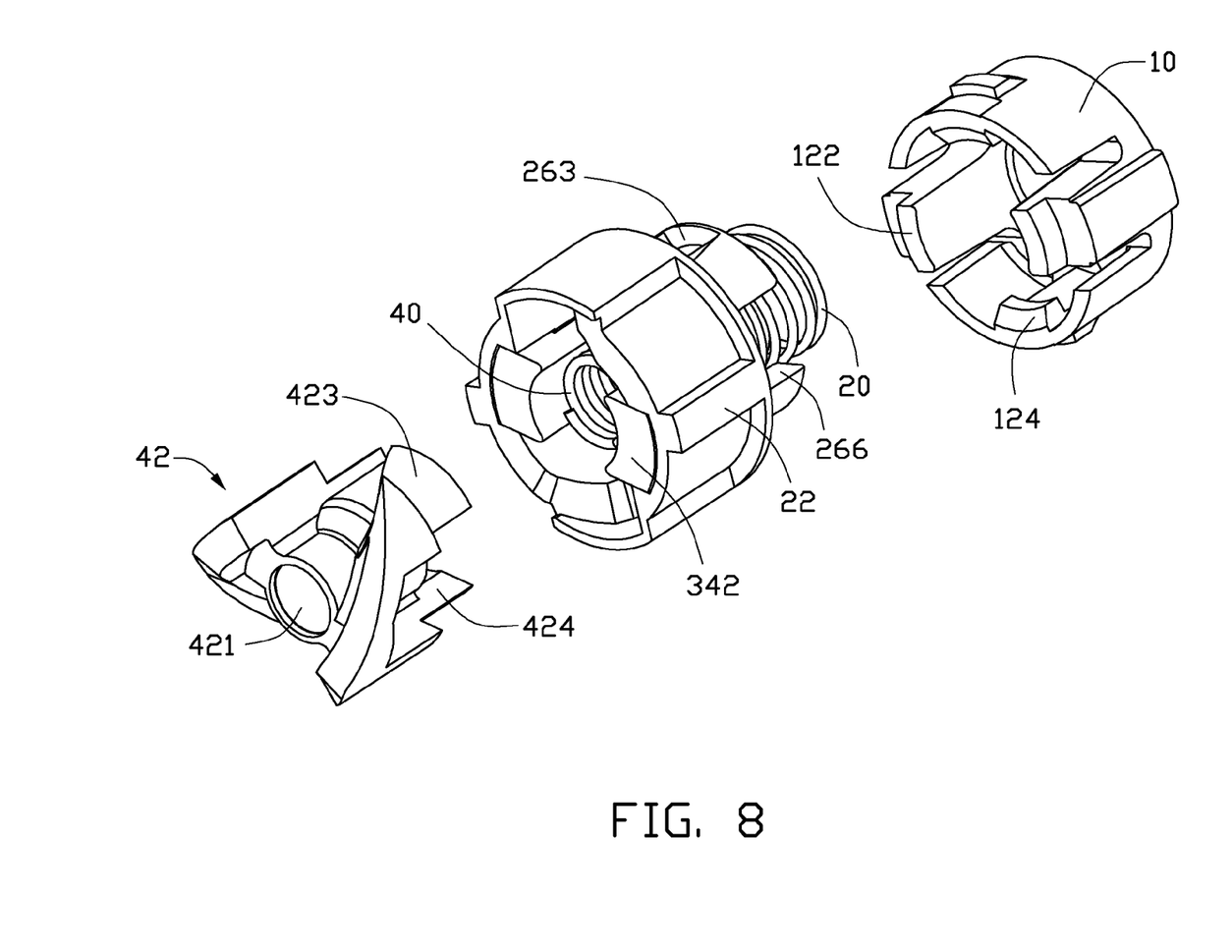
FIG. 8 is a partially assembled view showing the hinge assembly in FIG. 2.
Figure 9:
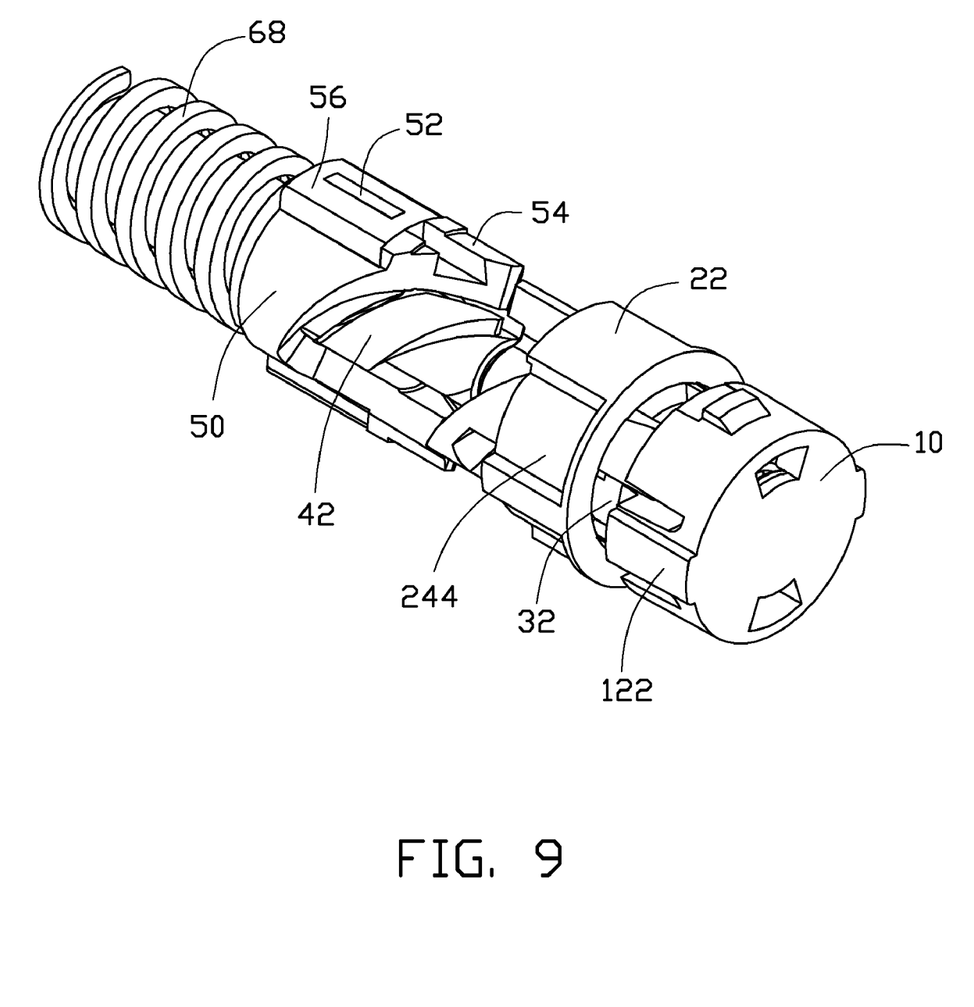
FIG. 9 is an assembled view showing the hinge assembly in FIG. 2 without the sleeve.
Figure 10:
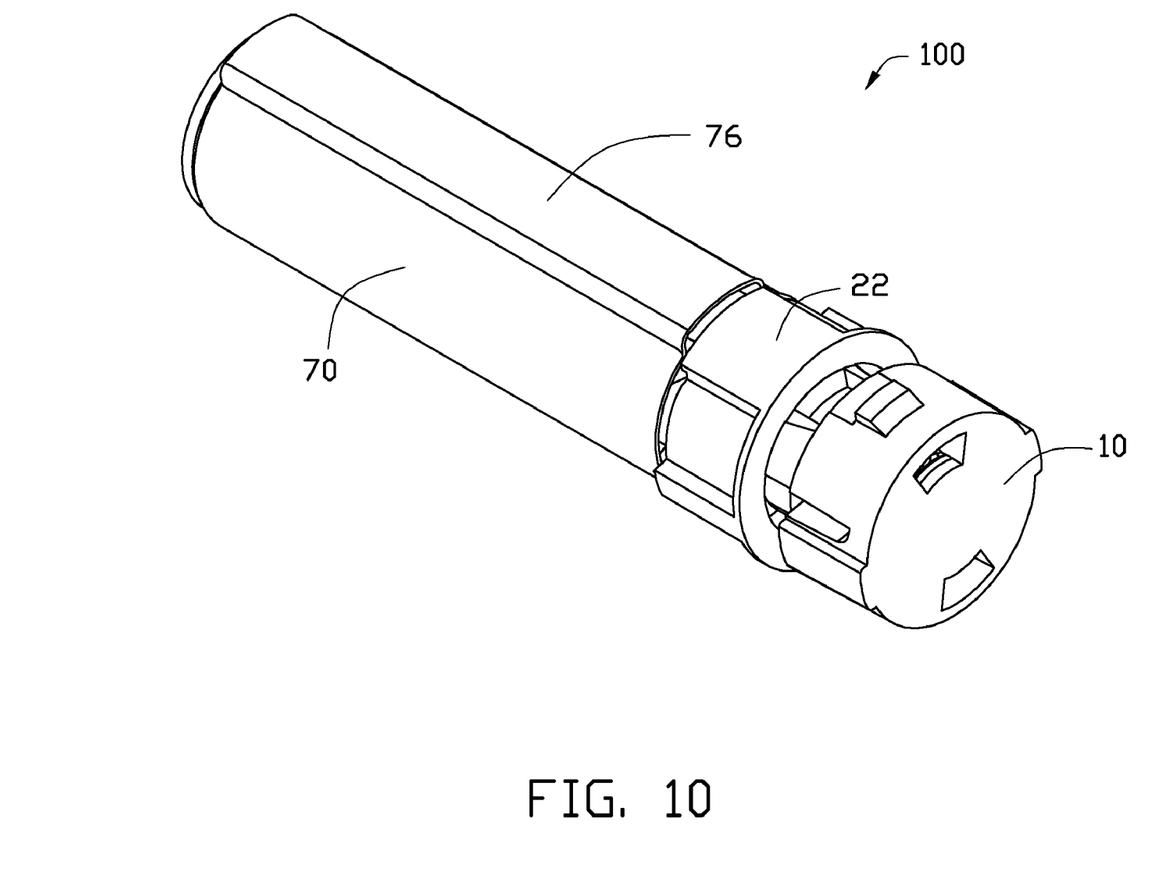
FIG. 10 is an assembled view showing the hinge assembly.

In assembly, referring to FIGS. 8 to 10, the cam 42, the second elastic member 40, the control member 30, the receiving seat 22 are fitted over the shaft 60 from the latching end 67. The control member 30 is received in the receiving seat 22. The body 32 abuts against the column 264, and is exposed from the guide grooves 266. The extension arms 34 with the blocks 342 are received in the limiting grooves 246. The first elastic member 20 is placed around the column 264 and is received in the receiving groove 265. The arms 122 are received in the guide grooves 266 and abut against the control member 30. The clasps 124 are slidably received in the notches 263 for preventing the button 10 from separating from the receiving seat 22. The second elastic member 40 is disposed between the control member 30 and the receiving seat 22. The extension arms 34 of the control member 130 are slidably engaged in the slots 424 of the cam 42 so that the control member 30 is locked with the cam 42.

Next, the follower 50 is placed around the shaft 60, with the first cam surface 422 of the cam 42 engaging with the second cam surface 522 of the follower 50. The main elastic element 68 is placed around the shaft 60 from the locking end 66. After the above elements are assembled, the sleeve 70 is placed around the shaft 60. The open end 72 of the sleeve 70 is adjacent to the receiving seat 22. The partially-closed end 74 of the sleeve 70 resists the main elastic element 68. The cushions 56 of the follower 50 are engaged in the trough 78 of the sleeve 70 to limit the rotation therebetween. Accordingly, the hinge assembly 100 is assembled. Because the control member 30 is locked with the receiving seat 22, the control member 30 cannot rotate relative to the receiving seat 22.

When a user wants to automatically open the mobile phone 200, he/she may press the button 10. In this process, the button 10 moves along an axial direction of the shaft 60, the arms 122 of the button 10 then push the control member 30 to move away from the button 10 in the axial direction of the shaft 60. The control member 30 moves along the axis until the extension arms 34 of the control member 30 break away from the limitation of the receiving seat 22, compressing the second elastic member 40 toward the cam 42. At that time, the button 10 is released. The control member 30, the cam 42, with the follower 50 automatically rotates relative to the shaft 60. The elastic potential energy of the second elastic spring 40 then pushes the control member 30 to move toward the button 10. Furthermore, the follower 50 brings the sleeve 70 to rotate so that the cover section of the mobile phone is opened. Since the soft cushions 54 engage with the sleeve 70, noises are greatly reduced when the sleeve 70 rotates relative to the follower 50. Additionally, the blocks 342 of the control member 30 allow the extensions 34 to be made of soft material. Thus, noises are also reduced when the control member 30 moves.

As described above, the present embodiment provides a hinge assembly 100 for use with various portable devices, beyond the mobile phone illustrated, and/or with other devices needing a hinge assembly that facilitates the achievement of fully open and fully closed positions.

It is believed that the present embodiments and their advantages will be understood from the foregoing description, and it will be apparent that different changes may be made thereto without departing from the spirit and scope of the disclosure or sacrificing all of its material advantages, the examples hereinbefore described merely being preferred or exemplary embodiments of the disclosure.

What is claimed is:

1. A hinge assembly, comprising: a receiving seat defining two limiting grooves; a control member, one end of the control member including two extensions received in the limiting grooves; a cam, another end of the control member slidably engaged with the cam; a follower engaging with the cam, the follower defining an inner thread; and a main shaft defining an outer thread, the receiving seat, the control member, the cam and the follower placed around the shaft, and the receiving seat being fixed with the main shaft; an elastic element providing an elastic force to make the cam and the follower resist each other; a cushion made from a material softer than a material of the follower, attached to the follower for reducing noises.

2. The hinge assembly as claimed in claim 1, wherein the cushion defines a cutout, the follower includes a projection being received in the cutout for latching the cushion to the follower.

3. The hinge assembly as claimed in claim 1, wherein a block radially extends from a distal end of each extension.

4. The hinge assembly as claimed in claim 1, wherein the receiving seat includes a seat portion and a latching portion connected to one end of the seat portion, an end of the seat portion spaced from the latching portion defines the limiting grooves.

5. The hinge assembly as claimed in claim 4, wherein the latching portion includes two opposite arcuate walls and a column, two guide grooves are defined between the arcuate walls, and the column extends from an inside of the arcuate walls, and is coaxially disposed with the seat portion.

6. The hinge assembly as claimed in claim 5, wherein a receiving groove is defined between the column and the arcuate walls, another elastic member is placed around the column, and is received in the receiving groove.

7. The hinge assembly as claimed in claim 1, further comprising a button, wherein the button includes two symmetric arms and two symmetric clasps, the receiving seat includes two arcuate walls and two guide grooves for receiving the arms, each arcuate wall defines a notch for receiving a corresponding clasp.

8. A foldable electronic device having at least two components hinged together by a hinge assembly, the hinge assembly comprising: a main shaft; a fixing seat defining two limiting grooves, the fixing seat is fixed with the main shaft; a follower placed around the shaft, the fixing seat selectively locked with the follower; a cam placed around the shaft, the cam engaging with the follower by means of a cam engagement; and an elastic element providing a force to make the cam and the follower rotate together when the fixing seat releases the follower; a control member, one end of the control member including extensions received in the limiting grooves, another end of the control member slidably engaged with the cam; a cushion defining a cutout, the follower includes a projection being received in the cutout for latching the cushion to the follower.

9. The foldable electronic device as claimed in claim 8, wherein a block radially extends from a distal end of each extension.

10. The foldable electronic device as claimed in claim 8, wherein the fixing seat includes a seat portion and a latching portion connected to one end of the seat portion, an end of the seat portion spaced from the latching portion defines the limiting grooves.

11. The foldable electronic device as claimed in claim 10, wherein the latching portion includes two opposite arcuate walls and a column, two guide grooves are defined between the arcuate walls, and the column extends from an inside of the arcuate walls, and is coaxially disposed with the seat portion.

12. The foldable electronic device as claimed in claim 11, wherein a receiving groove is defined between the column and the arcuate walls, another elastic member is placed around the column, and is received in the receiving groove.

13. The foldable electronic device as claimed in claim 8, further comprising a button, wherein the button includes two symmetric arms and two symmetric clasps, the fixing seat includes two arcuate walls and two guide grooves for receiving the arms, each arcuate wall defines a notch for receiving a corresponding clasp.

\* \* \* \* \*